Oct. 22, 1935.  S. M. COFFMAN  2,017,950
EMERGENCY BRAKE MECHANISM FOR AUTOMOTIVE VEHICLES
Filed Jan. 16, 1934
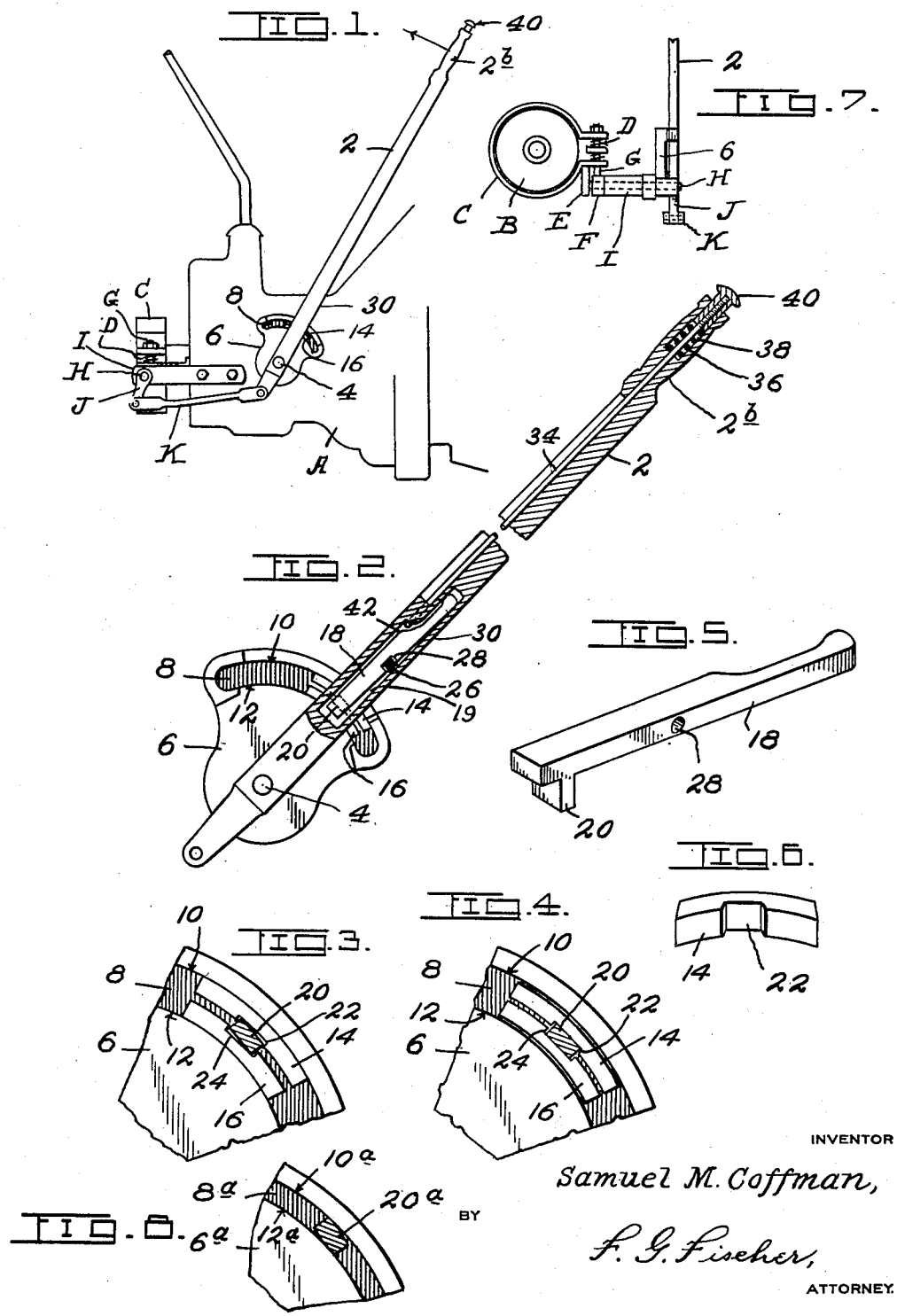
INVENTOR
Samuel M. Coffman,
BY
F. G. Fischer,
ATTORNEY Patented Oct. 22, 1935

2,017,950

UNITED STATES PATENT OFFICE 2,017,950

EMERGENCY BRAKE MECHANISM FOR AUTOMOTIVE VEHICLES

Samuel M. Coffman, Kansas City, Mo., assignor of one-third to Lily O. Coffman, Kansas City, Mo.

Application January 16, 1934, Serial No. 706,815

3 Claims. (Cl. 74—538)

My invention relates to emergency brake mechanisms for automotive vehicles and one object is to provide a mechanism of this character in which the hand lever is automatically secured from accidental forward movement after being pulled backwardly by hand to set or apply the brake.

In the usual type of mechanism where a pawl and ratchet are employed for securing the hand lever in active position the ratchet teeth often become filled with dirt and grease which prevent proper engagement of the pawl with said teeth. Hence, when the vehicle is parked on an incline there is danger of traffic vibrations jarring the pawl loose and thereby releasing the brake mechanism from active position so that it will fail to prevent the vehicle from descending the incline.

In the present invention the parts are so constructed and arranged that accidental release of the brake mechanism after being set is impossible.

In order that the invention may be fully understood, reference will now be had to the accompanying drawing, in which:

Fig. 1 is a fragmentary side elevation of a transmission case with the emergency brake mechanism associated therewith.

Fig. 2 is an enlarged vertical sectional view of a hand lever with some of the associated parts forming important features of the invention.

Fig. 3 is a fragmentary side elevation of a sector and means coacting therewith for controlling the forward movement of the hand lever, said means being in active position.

Fig. 4 is a view similar to Fig. 3 with the lever controlling mechanism in inactive or released position.

Fig. 5 is a detail perspective view of an actuating member carried by the hand lever.

Fig. 6 is a detail perspective view of a friction shoe.

Fig. 7 is a rear elevation of the brake mechanism.

Fig. 8 is a fragmentary detail of a modification of some of the parts shown by Figs. 3 and 4.

Referring in detail to the different parts, A designates the transmission case of an automotive vehicle, B the emergency brake-wheel, C the emergency brake-band, D the springs for releasing the brake-band C from the brake-wheel B, E a cam for tightening the brake-band upon the brake-wheel, F and G elements coacting with the cam E for tightening the brake-band, H a rock shaft, I a bearing in which said rock shaft is mounted, J a crank for actuating said rock shaft, and K a connecting rod pivotally secured at its rear end to the crank J. All of the foregoing parts may be of any usual or preferred construction.

Referring now more particularly to the parts forming the present invention, 2 designates a hand lever pivotally secured at its lower end to the forward end of the connecting rod K and mounted upon a fulcrum 4 projecting laterally from the transmission case A.

6 designates a sector fixed to the transmission case A and provided with an arcuate grooved portion 8 having its radius extending from the center of the fulcrum 4. The grooved portion 8 has upper and lower friction surfaces 10 and 12 which cooperate with friction shoes 14 and 16, respectively, reciprocably mounted within said grooved portion 8.

18 designates a shoe actuating member or detent operably mounted within a cavity 19 in the hand lever 2 and provided near its lower end with a lateral projection 20 which projects into recesses 22 and 24 formed in the intermediate portions of the shoes 14 and 16, respectively, to assist in holding said shoes in assembly with the projection 20.

Normally the detent 18 is held in the angular or active position shown by Figs. 2 and 3 through the intermediary of a coil spring 26 having one end bearing against the bottom of a recess 28 in the detent 18, and its opposite end bearing against the inner surface of the front wall 30 of the lever 2.

34 designates a rod for throwing the detent 18 to inactive position so that its projection 20 will release the shoes 14 and 16 from the friction surfaces 10 and 12, respectively, as shown by Fig. 4. The rod 34 is normally held in raised or inactive position by means of a coil spring 36 arranged in a counterbore 38 in the upper end of the lever 2. The upper end of the rod 34 is provided with a knob 40 reciprocably mounted in the counterbore 38. The knob 40 projects from the upper end of the counterbore so that it can be depressed by the thumb of the hand which operates the hand lever 2.

In practice the operation is as follows: When it is desired to apply the emergency brake the driver of the vehicle grasps the hand lever 2 and pulls it backwardly in the direction of the arrow, Fig. 1, to draw the brake-band C into frictional engagement with the brake-wheel B. As the hand lever 2 moves backwardly it carries the upper end of the detent 18 backwardly therewith while the lower end of the detent remains stationary until the projection 20 releases the shoes 14 and 16 from frictional engagement with the respective friction surfaces of the sector 6, Fig. 4, whereupon the detent 18 and the shoes 14 and 16 move backwardly with the lever 2 until the latter is checked by the driver. When backward movement of the lever 2 is checked the spring 26, which was compressed when the lower end of the detent remained stationary as above stated, expands and moves the lower end of the detent rearwardly of its upper end so that the projection 20 will adjust the shoes 14 and 16 into active position, Figs. 2 and 3. The friction shoes 14 and 16 now securely lock the hand lever 2 from accidental forward movement as any force acting to move said hand lever forward tends to throw the lateral projection 20 at a greater angle to the shoes 14 and 16 and thereby increases the pressure of said shoes against the respective friction surfaces 10 and 12.

When the driver desires to release the brake it is only necessary to grasp the handle 2a of the hand lever 2, pull the same backwardly a short distance and depress the knob 40, whereupon the hand lever 2 may be swung forwardly until the knob 40 is released. As the knob 40 is depressed it pushes the rod 34 downwardly against the shoulder 42 on the detent 18 and thus moves the lower end of the latter forwardly until the lug 20 is in parallelism. Fig. 4, with the friction shoes 14 and 16, thereby releasing said shoes from frictional engagement with the respective surfaces 10 and 12, so that there will be no frictional resistance to overcome.

In the modified form shown by Fig. 8 the parts are substantially the same as in the form above described as is evidenced by corresponding reference numerals with exponents a, the chief difference being that the friction shoes 14 and 16 are dispensed with and the projection 20a is arranged to directly engage the friction surfaces 10a and 12a to hold the hand lever from accidental forward movement.

While I have shown the lever 2 and the associated mechanism for preventing accidental forward movement of said lever in connection with the emergency brake of an automotive vehicle, it is obvious that said lever and associated mechanism may be used in other situations either in the forms shown and described or in such other forms as properly fall within the spirit and scope of the invention as claimed.

Having thus described my invention, what I claim and desire to secure by Letters Patent, is:

1. In combination, a sector, a detent, spring means engaging the detent and adapted to normally hold the lower end thereof in frictional engagement with the sector, a hand lever having a longitudinal cavity in which the detent and said spring means are operably mounted, said lever being adapted when swung in one direction to contact and disengage the lower end of the detent from frictional engagement with the sector, and manually controlled means carried by the lever for disengaging the lower end of the detent from frictional engagement with the sector to permit the lever to be swung in the reverse direction.

2. In combination, a sector, a detent, spring means normally holding said detent in frictional engagement with said sector, a hand lever having a longitudinal opening therein and carrying the detent and said spring means, said lever being adapted, when swung in one direction, to contact and release the detent from frictional engagement with the sector, and a member operably mounted in the opening in said lever and adapted to be manually forced against the detent to move the same to inactive position and permit the lever to be swung in the reverse direction.

3. In combination, a sector, a detent, shoes normally held in frictional engagement with the sector by said detent, spring means normally holding said detent in active position, a hand lever having a longitudinal opening therein and carrying the detent and said spring means, said lever being adapted, when swung in one direction, to contact and move the detent to inactive position and thereby release the shoes from frictional engagement with the sector, and a rod slidably mounted in the longitudinal opening in the lever and adapted to be manually forced against the detent to move the same to inactive position so that the lever may be swung in the reverse direction.

SAMUEL M. COFFMAN.